(12) United States Patent
Menge et al.

(10) Patent No.: US 8,614,420 B2
(45) Date of Patent: Dec. 24, 2013

(54) RADIATION DETECTION SYSTEM INCLUDING A PLURALITY OF SCINTILLATORS HAVING DIFFERENT LIGHT YIELDS AND METHOD OF USING THE SAME

(75) Inventors: Peter R. Menge, Novelty, OH (US); Rongfu Li, Shrewsbury, MA (US); Anne B. Hardy, Paris (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 332 days.

(21) Appl. No.: 12/985,977

(22) Filed: Jan. 6, 2011

(65) Prior Publication Data

US 2011/0192981 A1 Aug. 11, 2011

Related U.S. Application Data

(60) Provisional application No. 61/293,039, filed on Jan. 7, 2010.

(51) Int. Cl.
*G01T 1/20* (2006.01)

(52) U.S. Cl.
USPC ..................................... 250/362; 250/361 R

(58) Field of Classification Search
USPC ............................................. 250/362, 361 R
See application file for complete search history.

(56) References Cited

U.S. PATENT DOCUMENTS

| | | |
|---|---|---|
| 4,316,817 A | 2/1982 | Cusano et al. |
| 4,375,423 A | 3/1983 | Cusano et al. |
| 4,795,910 A | 1/1989 | Henderson et al. |
| 6,362,479 B1 | 3/2002 | Andreaco et al. |
| 6,392,236 B1 | 5/2002 | Maekawa et al. |
| 6,911,251 B2 | 6/2005 | Duclos |
| 7,105,832 B2 | 9/2006 | Dai et al. |
| 7,145,149 B2 | 12/2006 | Cooke et al. |
| 7,335,418 B2 | 2/2008 | Sato et al. |

(Continued)

FOREIGN PATENT DOCUMENTS

| | | |
|---|---|---|
| JP | 62247280 A | 10/1987 |
| WO | 2009083852 A2 | 7/2009 |

OTHER PUBLICATIONS

Althues, H., et al. "Synthesis and Characterization of Transparent Luminescent ZnS:Mn/PMMA Nanocomposites", Chem. Mater. 2006, 18, pp. 1068-1072.

(Continued)

*Primary Examiner* — Christine Sung
(74) *Attorney, Agent, or Firm* — Abel Law Group, LLP; Robert N. Young

(57) ABSTRACT

A radiation detection system can include a scintillating member including a polymer matrix, a first scintillating material, and a second scintillating material different from the first scintillating material and at least one photosensor coupled to the scintillating member. The radiation detection system can be configured to receive particular radiation at the scintillating member, generate a first light from the first scintillating material and a second light from the second scintillating material in response to receiving the particular radiation, receive the first and second lights at the at least one photosensor, generate a signal at the photosensor, and determine a total effective energy of the particular radiation based at least in part on the signal. Practical applications of the radiation detection system can include identifying a particular isotope present within an object, identifying a particular type of radiation emitted by the object, or locating a source of radiation within the object.

17 Claims, 8 Drawing Sheets

(56) References Cited

U.S. PATENT DOCUMENTS

| | | |
|---|---|---|
| 7,547,888 B2 | 6/2009 | Cooke et al. |
| 7,582,880 B2 * | 9/2009 | Wallace et al. .......... 250/390.11 |
| 2003/0030003 A1 | 2/2003 | Maekawa et al. |
| 2006/0054863 A1 | 3/2006 | Dai et al. |
| 2008/0237470 A1 * | 10/2008 | Loureiro et al. .......... 250/361 R |
| 2009/0140158 A1 * | 6/2009 | Clothier et al. .......... 250/390.11 |

OTHER PUBLICATIONS

McKigney, Edward A., et al. "Nanocomposite Scintillators for Radiation Detection and Nuclear Spectroscopy", Nuclear Instruments and Methods in Physics Research A, 2007, pp. 15-18.

* cited by examiner

RADIATION DETECTION SYSTEM INCLUDING A PLURALITY OF SCINTILLATORS HAVING DIFFERENT LIGHT YIELDS AND METHOD OF USING THE SAME

CROSS-REFERENCE TO RELATED APPLICATION

This application claims priority under 35 U.S.C. §119(e) to U.S. Patent Application No. 61/293,039 entitled "Radiation Detection System Including a Plurality of Scintillators Having Different Light Yields and Method of Using the Same," by Menge et al., filed Jan. 7, 2010, which is assigned to the current assignee hereof and incorporated herein by reference in its entirety.

FIELD OF THE DISCLOSURE

The present disclosure is directed to radiation detection systems including a plurality of scintillators having different light yields and method of using the same.

BACKGROUND

Radiation detection systems are used in a variety of applications. For example, scintillators can be used for medical imaging and for well logging in the oil and gas industry. Composite scintillators have been proposed. In particular, a composite scintillator can be transparent and include a material having optical transparency. The material can be in the form of nano-sized objects having a size in at least one dimension that is less than the wavelength of light emitted by the composite scintillator. Further improvement of composite scintillators is desired.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillating and radiation detection arts.

Figure 1:
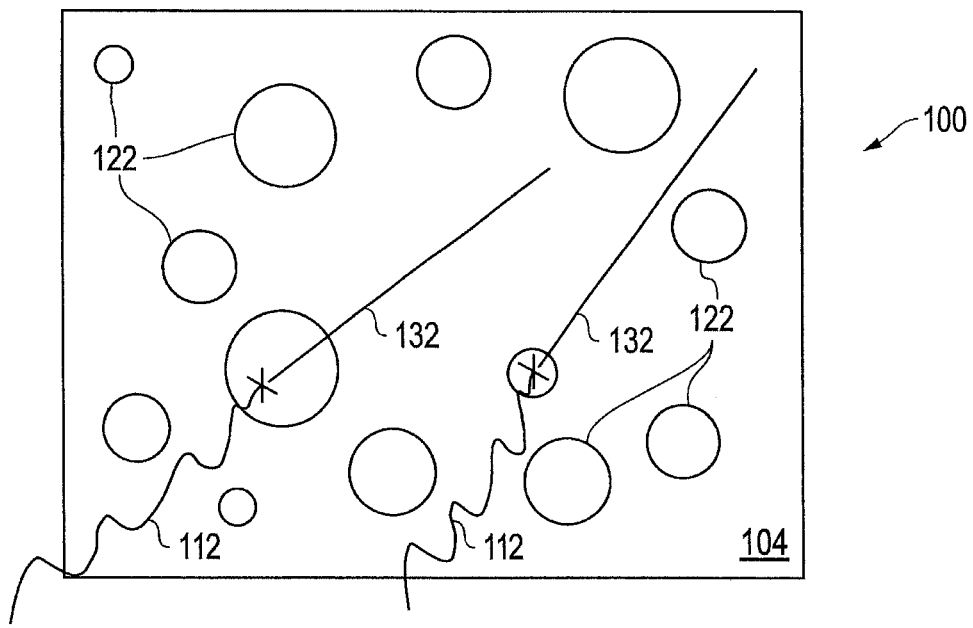
FIG. 1 includes an illustration of an electron emission from scintillating particles.

Prior to the embodiments described herein, radiation detection systems have been limited in size due to limitations on size of scintillator crystals, transmission of light over significant distances, loss of energy information, and potentially other practical limitations. Referring to FIG. 1, a scintillating member 100 can include nano-sized, inorganic scintillating particles 122 as the only scintillating particles within a polymer matrix 104, wherein the polymer matrix 104 does not scintillate. The scintillating particles 122 can receive a gamma ray 112. Within the scintillating particles 122, gamma rays 112 cause electrons 132 to be generated within the scintillating particles 122 (noted with an "x" within the scintillating particles 122); however, because the scintillating particles 122 are small, the electrons 132 may exit the scintillating particles 112 before emitting light. The electrons 132 may travel within the polymer matrix 104 and be slowed to thermal temperature and accordingly, not emit scintillation light.

Embodiments as described herein can address the limitations of prior radiation detection systems. For example, a scintillating material can include nano-sized particles within a polymer matrix to allow a larger scintillator that is transparent to be formed. Inorganic scintillating compounds typically have a greater light yield (photons per unit energy) than organic scintillating compounds.

With respect to concentration, when the concentration of the inorganic scintillating particles 122 is too high, the polymer matrix 104 may be difficult to process, as the flow and other processing characteristics may adversely affect the ability to process the polymer using conventional polymer process machinery. Thus, merely increasing the concentration of the inorganic scintillating particles 122 may be limited.

Figure 2:
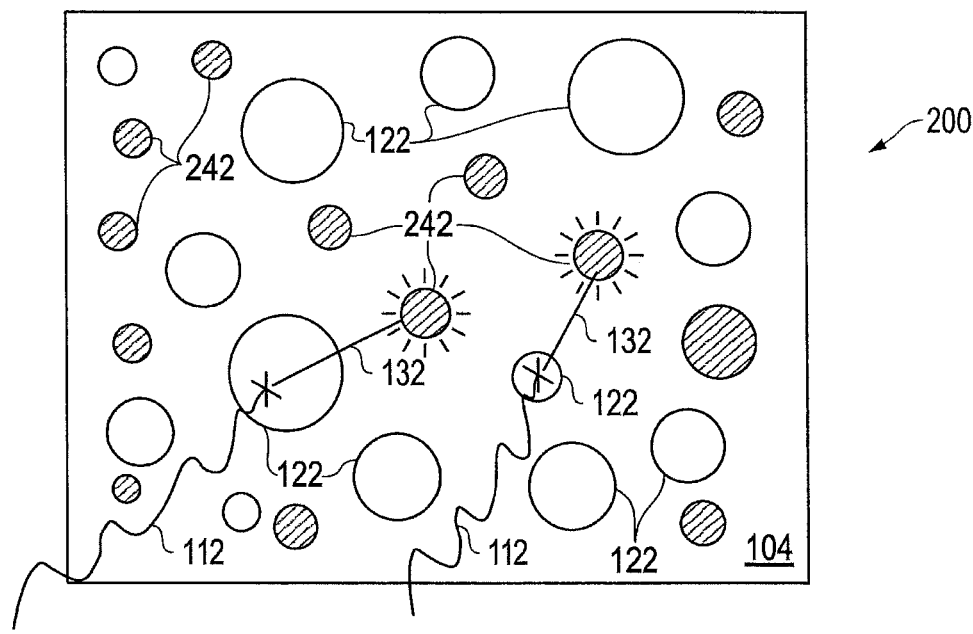
FIG. 2 includes an illustration of scintillating light caused by electron emission from scintillating particles.

Another scintillating material can be a part of or incorporated within the polymer matrix. Referring to the embodiment as illustrated in FIG. 2, a scintillating member 200 can include nano-sized, organic scintillating material 242 within the polymer matrix 104. The organic scintillating material 242 is illustrated by shaded circles even though the organic scintillating material 242 can be dissolved within the polymer matrix. Note that the organic scintillating material 242 may not be in particle form, but is illustrated as circles to aid in the understanding of the concepts described herein. By including the organic scintillating material 242, the polymer matrix 104 can have a higher concentration of scintillating materials, yet still allow for good polymer processing characteristics. In the situation where electrons 132 exit the scintillating particles 122, the electrons 132 have a greater likelihood of reaching scintillating particles, such as scintillating material 242, before the electron is thermally absorbed. When the electrons 132 reach the scintillating material 242 and go into a lower energy state, light is emitted by the scintillating material 242. Accordingly, an electron has a greater likelihood of being captured and emitting light, rather than the electron being slowed to thermal temperature before light is emitted. The nano-sized scintillating particles 122 and scintillating material 242 allow the scintillating member 200 to remain transparent.

The light emitted by the scintillating member 200 can be received by a photosensor to convert the light to an electronic pulse or other signal that is received by a processing module. Because the scintillating particles 122 and 242 can have different light yields, the raw data, by itself, received from the photosensor may not provide accurate data regarding energies of the gamma rays. As will be described herein, the particular selection of materials and configurations can be implemented to determine more accurately the amount of radiation received by the radiation detection system. The information obtained may be useful in identifying a particular isotope or a particular type of radiation present within an object or to more precisely locate a source of radiation within the object. More details regarding the selection of materials and configurations are described later in this specification. Two different radiation detection systems are described with respect to FIGS. 3 and 4 before addressing such details.

Figure 3:
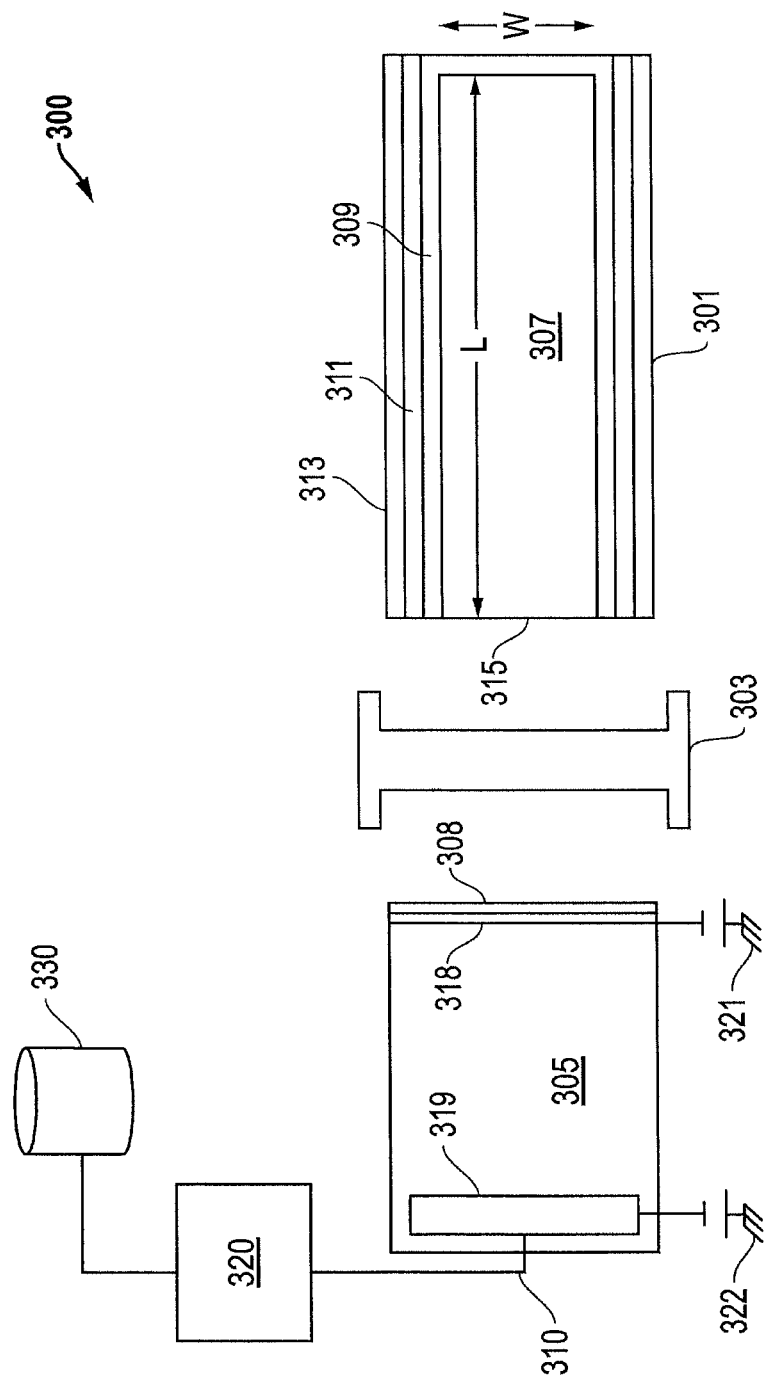
FIG. 3 includes an illustration of a radiation detection system.

FIG. 3 illustrates a particular embodiment of a radiation detection system 300. The radiation detection system 300 can include a scintillator 301 coupled to a photosensor 305. In one embodiment, the radiation detection system 300 can include a light pipe 303. Though the scintillator 301, the light pipe 303, and the photosensor 305 are illustrated separate from each other, the scintillator 301 and the photosensor 305 can be coupled to each other directly or via the light pipe 303. In one embodiment, the scintillator 301 and the photosensor 305 can be coupled to the light pipe 303 using an optical gel, bonding agent, fitted structural components, or any combination thereof.

The scintillator 301 can include a scintillating member 307 housed within a casing 313. The scintillating member 307 can detect neutrons, gamma radiation, other particular radiation, or any combination thereof. In an embodiment, the scintillating member 307 can include a plurality of different scintillating materials. Details regarding the composition of the scintillating material are described in more detail later in this specification. In an embodiment, the scintillating member 307 has a length, L, and a width, W, as illustrated in FIG. 3. In a particular embodiment, the scintillating member 307 has a length of at least approximately 0.5 meters. For example, the scintillating member 307 has a length of at least approximately 0.7 meters or at least approximately 1.1 meters. In another example, the scintillating material extends greater than 2 meters, such as greater than 3 meters, or another length corresponding to a height of a person, a vehicle, such as an automobile, a truck, a watercraft, a rail car, an aircraft, other suitable cargo vehicle, or any combination thereof. In another embodiment, the scintillating member 307 can have a width, W, substantially perpendicular to the length, L, where the width is at least approximately 0.01 meters and at most equal to the length L. For example, the scintillating member 307 can be a polygon having a width of at least approximately 0.01 meters. In another example, the scintillating member 307 can be substantially cylindrical and can have a diameter, a particular type of width, of at least approximately 0.1 meters.

In a particular embodiment, the scintillator 301 can be surrounded by a neutron moderator (not illustrated), such as polyethylene or another material, to convert fast neutrons into thermal neutrons, when the particular radiation is thermal neutrons. The scintillator 301 can also include a reflector 309. In one embodiment, the casing 313 can include a material that is substantially non-reactive with the scintillating member 307, environmental conditions, or any combination thereof. For example, the casing material can include stainless steel, plastic, another suitable material, or any combination thereof. A shock-absorbing member 311 may be disposed between the casing 313 and the reflector 309. Further, the casing 313 can include an output window 315 that is interfaced to an end of the scintillating member 307. The output window 315 can include glass or another transparent or translucent material suitable to allow photons emitted by the scintillator 301 to pass toward the photosensor 305. In an illustrative embodiment, an optical interface, such as clear silicone rubber, can be disposed between the scintillating member 307 and the output window 315. The optical interface can be polarized to align the reflective indices of the scintillating member 307 and the output window 315.

As illustrated, the light pipe 303 is disposed between the photosensor 305 and the scintillator 301 and facilitates optical coupling between the photosensor 305 and the scintillator 301. In one embodiment, the light pipe 303 can include a quartz light pipe, plastic light pipe, or another light pipe. In another embodiment, the light pipe 303 can include a silicone rubber interface that optically couples an output window 315 of the scintillator 301 with the input 308 of the photosensor 305. In a further embodiment, a plurality of light pipes can be disposed between the photosensor 305 and the scintillator 301.

The photosensor 305 can include, for example, a photodiode, a photomultiplier tube (PMT), a silicon photomultiplier (SiPM), an avalanche photodiode (APD) or a hybrid PMT that includes a photocathode and a semiconductor electron sensor. The photosensor 305 can be housed within a tube or housing made of a material capable of protecting electronics associated with the photosensor 305, such as a metal, metal alloy, another material, or any combination thereof.

The photosensor 305 can include an input 308, such a window that can include any of the materials described with respect to the output window 315. The input 308 and the output window 315 can have substantially the same composition or can have different compositions. In a particular, illustrative embodiment, the photosensor 305 receives light from the scintillator 301 via the input 308. The output window 315 or the input 308 may have a discrete filter material incorporated therein. In another embodiment, a filter may be another location between the scintillating member 307 and a photocathode 318 of the photosensor 305. In a particular embodiment, the filter material or discrete filter can be used to allow some light, but not all light to pass. For example, a blue filter material or blue filter may allow blue light to pass, but block another spectrum light, for example, red light.

In a particular embodiment, the photosensor 305 can receive light emitted by the scintillator 301 as a result of the scintillating member 307 receiving gamma radiation, neutrons, other particular radiation, or any combination thereof. Photons in the light can strike the photocathode 318 of the photosensor 305 and transfer energy to electrons in a valence band of the photocathode 318. The electrons become excited until they are emitted as electrons from a surface of the photocathode 318 that is opposite the input 308. In a particular embodiment, the surface of the photocathode 318 can include a layer of electropositive material that can facilitate emission of the electrons from the surface of the photocathode 318.

Electrons emitted by the photocathode 318 are collected at an anode of the photosensor 305, and a signal, in the form of one or more electronic pulses, are sent to the pulse analyzer 320 via the output 310. In an example, a voltage 321, such as a supply voltage or other voltage, is applied to the photocathode 318. Electrons emitted from the surface of the photocathode 318 can be accelerated, by the voltage 321, to strike the surface of an electron detector 319. In addition, a voltage 322, such as a reverse bias voltage or other voltage, can be applied to the electron detector 319. Energy from electrons entering the electron detector can produce carriers that are removed from the electron detector 319 by the reverse bias voltage 322, thus creating an electrical pulse.

The photosensor 305 can be coupled to a processing module 320. As illustrated in the embodiment of FIG. 3, an electronic pulse or other signal is sent from the photosensor 305 to a processing module 320, via an output 310, which can be in the form of a coaxial cable or other electronic transmission medium to transmit electrical signals from the photosensor 305 to the processing module 320. The processing module 320 can be configured to perform a variety of operations that are described in more detail later in this specification. The processing module can include hardware, firmware, or any combination thereof that is configured to perform operations as described later in this specification. Examples of such hardware and firmware include circuits within one or more integrated circuits, one-time programmable devices, field programmable gate arrays, application-specific integrated circuits, and the like. After reading this specification, skilled artisans will appreciate that other components can be used. In another embodiment, the processing module 320 can include a central processing unit, a graphics processing unit, another suitable processing unit, or any combination thereof. In still another embodiment, the processing module 320 can be coupled to a storage device 330, which can be a tangible processor-readable medium. The storage device 330 can include a hard disk, a read-only memory, random-access memory, a memory drive within a storage network, or the like. The storage device 330 can include code. The processing module 320 can retrieve code from the storage device 330, wherein the code includes instructions to carry out the operations. The processing module 320, the storage device 330, or both may be coupled to other equipment within the radiation detection system 300 or may be coupled to networking equipment (not illustrated).

Figure 4:
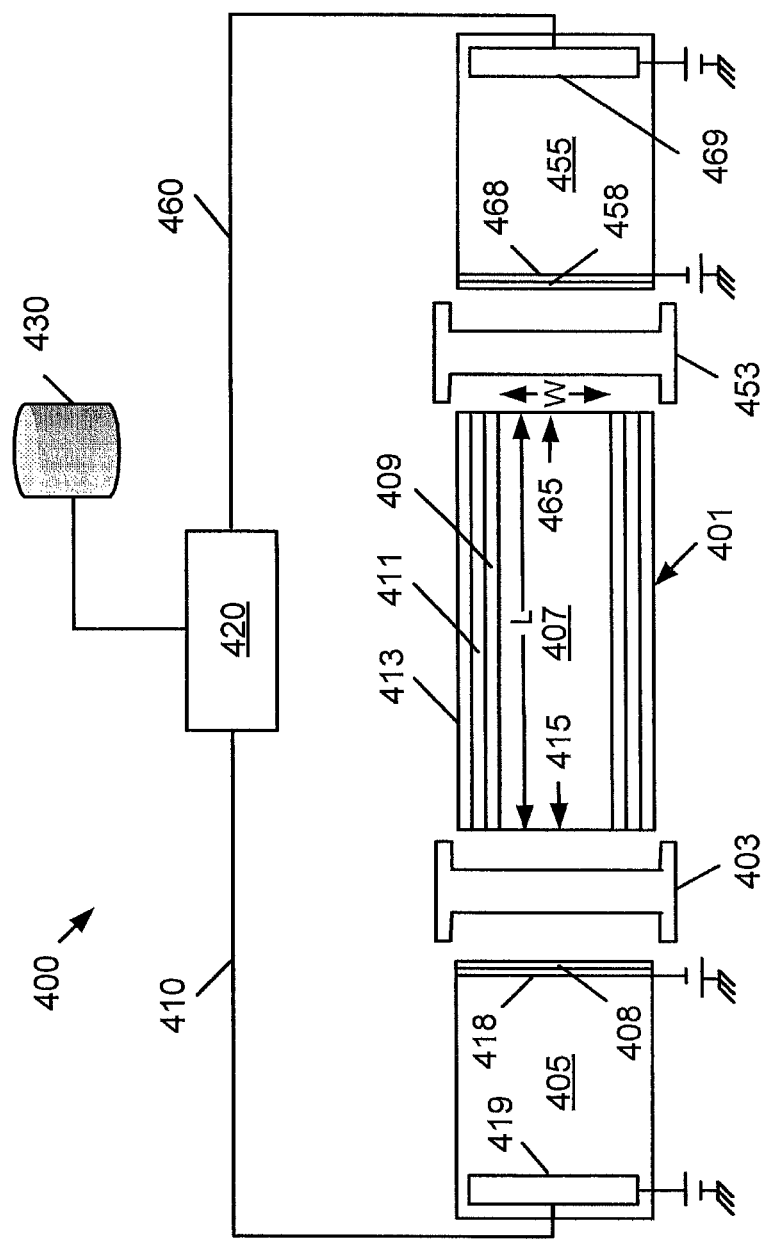
FIG. 4 includes an illustration of another radiation detection system.

FIG. 4 illustrates another particular embodiment of a radiation detection system 400 that similar to the radiation detection system 300 except that the radiation detection system 400 includes two photosensors 405 and 455 coupled to a scintillator 401. Many of the functions, compositions, and configurations of components within the radiation detection system 400 will be described with respect to corresponding components of the radiation detection system 300.

With respect to the scintillator 401, its configuration may or may not be modified to allow it to be coupled to the photosensors 405 and 455. The scintillating member 407 can perform any of the functions of the scintillating member 307. The scintillator 401 can be surrounded by a neutron moderator (not illustrated) that performs any of the functions or include any of the materials described with respect to the neutron moderator described with respect to the scintillator 301. A reflector 409, a shock-absorbing member 411, and the casing 413 can perform any of the functions of any include any of the materials previously described with respect to the reflector 309, the shock-absorbing member 311, and the casing 313, respectively. The configuration of the reflector 409, a shock-absorbing member 411, and the casing 413 may be modified so that to allow two photosensors to be coupled to the scintillator 401. Output windows 415 and 465 can perform any of the functions of any include any of the materials used within the output window 315. Light pipes 403 and 453 can perform any of the functions of and include any of the materials used within the light pipe 303. The output window 415 may be the same or different configuration or materials as compared to the output window 465, and the light pipe 403 may be the same or different configuration or materials as compared to the light pipe 453.

The photosensors 405 and 455 can perform any of the functions and include any of the components as described with respect to the photosensor 305. The photosensors 405 and 455 can be of the same type or different types as compared to each other. Selection of photosensors 405 and 455 is addressed later in this specification. Input 408 and 458 can perform any of the functions of any include any of the materials used with the input 308. The output window 415 or 465, the input 408 or 458, or any combination of such window may have a filter material incorporated therein. In another embodiment, one or more discrete filters may be at a location between the scintillating member 407 and the photocathode 418 of the photosensor 405 and between the scintillating member 407 and the photocathode 468 of the photosensor 455. In a particular embodiment, the radiation detection system 400 can include different filtering materials or discrete filters, such that the photosensor 405 receives blue light and no or a significantly reduced amount of green light, and the photosensor 455 receives green light and no or a significantly reduced amount of blue light. Clearly, other filter combinations may be used if needed or desired. Photocathodes 418 and 468 can perform any of the functions of any include any of the materials used within the photocathode 308. Electron detectors 419 and 469 can perform any of the functions of and include any of the materials used within the electron detector 319.

An output 410 is coupled to the electron detector 419 and a processing module 420, and an output 460 is coupled to the electron detector 469 and the processing module 420. The outputs 410 and 460 can perform any of the functions and any include any of the materials used within the output 310. The processing module 420 and a storage device 430 can perform any of the functions of and be configured as described with respect to the processing module 320 and the storage device 330, respectively. Further, the processing module 420 can be configured to allow for a plurality of photosensors, rather than a single photosensor, to be coupled to the processing module 420.

The scintillating members 307 and 407 can include a composite of at least two different scintillating materials. In a particular embodiment, the scintillating members 307 and 407 can include nano-sized scintillating particles within a polymer matrix. The polymer matrix can include polyvinyltoluene ("PVT"), polystyrene ("PS"), polymethylmethacrylate ("PMMA"), another suitable polymer, or any copolymer thereof.

A scintillating material within the polymer matrix can include nano-sized, inorganic scintillating particles. The inorganic scintillating particles can include a sodium iodide, a calcium fluoride, a cesium iodide, a cesium lithium elpasolite, a lanthanum bromide, a lanthanum chloride, a lutetium iodide, a bismuth germanate ("BGO"), a lutetium silicate, or another suitable compound. In a particular embodiment, the inorganic scintillating particles can include NaI(Tl), $CaF_2$(Eu), PbS, $LaBr_3$(Ce), BGO, or a lutetium yttrium silicate. Any of the foregoing compounds may include an impurity, wherein the impurity is any of the rare earth elements or Tl. As used herein, the rare earth elements include the lanthanide series of elements, Y, and Sc. After reading this specification, skilled artisans will appreciate that other inorganic scintillating compounds can be used without departing from the concepts described herein.

In a particular application, the selection of a scintillating material may be affected by a desire to increase radiation stopping power, as a higher atomic number helps to increase radiation stopping power. For example, an inorganic scintillator can be selected to have a relatively high effective atomic number. The effective atomic number is calculated using the following equation.

$$Z_{eff} = [\Sigma(a/(a+b\ldots n))*Z_{A1}^{3.6}) + (b/(a+b+\ldots n))*Z_{B1}^{3.6}) + \ldots (n/(a+b+\ldots n))*Z_{N1}^{3.6})]^{1/3.6}$$

wherein:

A1, B1, ... N1 represent different elements within the scintillator material, a, b, ... n represent subscripts or formula units of elements A1, B1, ... N1, respectively, within the molecular formula of the scintillator material.

The calculation of the effective atomic number may be better understood with an example where the scintillator material is $LaBr_3$. La makes up ¼ of all of the atoms in the compound, and Br makes up ¾ of all of the atoms in the compound. The atomic number of La is 57, and the atomic number of Br is 35. Using the formula above, $$Z_{eff} = \left[\sum (1/(1+3))^* Z_{La}^{3.6}) + (3/(1+3))^* Z_{Br}^{3.6})\right]^{1/3.6}$$

$$= \left[\sum (1/4)^*(57^{3.6}) + (3/4)^*(35^{3.6})\right]^{1/3.6}$$

$$= 44 \text{(when rounded to the nearest whole number)}$$

Thus, using the equation above, $LaBr_3$ has an effective atomic number of approximately 44. In an embodiment, the effective atomic number may be at least approximately 20, in another embodiment, at least approximately 30, and in a further embodiment, at least approximately 40.

The nano-sized scintillating particles can be characterized by an averaged size. The averaged size can be an average, median, or geometric mean of a dimension of the particles, such as a width, length, diameter, major axis, minor axis, or other suitable dimension of the particles. In one embodiment, the averaged size of the scintillating particles is no greater than one half of the wavelength at the emission maximum of the light emitted by a material by a material that comprises the scintillating particles, for example, the material within the inorganic scintillating particles. In another embodiment, the averaged size is no greater than 90 nm, and in a still another embodiment, the averaged size is no greater than 50 nm. In a further embodiment, the averaged size is at least 1 nm, and in a still a further embodiment, the averaged size is at least 3 nm. In a particular embodiment, the averaged size is in a range of 5 nm to 20 nm. The size distribution may be controlled. In an embodiment, the scintillating particles are characterized by a $5^{th}$ percentile size and a $95^{th}$ percentile size, wherein the $95^{th}$ percentile size is no greater than 4 times the $5^{th}$ percentile size. In a particular embodiment, the scintillating particles are characterized by a $1^{st}$ percentile size and a $99^{th}$ percentile size, wherein the $99^{th}$ percentile size is no greater than 4 times the $1^{st}$ percentile size.

Different methods can be used to achieve a desired particular size or particle size distribution. In one embodiment, a sieve can be used. In another embodiment, electrical charge can be used to separate particles of different sizes. In still another embodiment, a cyclone separator can be used. Other methods of achieving a particle size distribution can be used without departing from the concepts as described herein.

The concentration of the nano-sized, inorganic scintillating particles can be at least 0.1 volume % and no greater than 75 volume %. In an embodiment, the concentration can be at least 1 volume %, and in another embodiment, the concentration can be at least 5 volume %. In a further embodiment, the concentration can be no greater than 50 volume %, and in another embodiment, the concentration can be no greater than 40 volume %. In a particular embodiment, the concentration can be in a range of 2 volume % to 30 volume %. After reading this specification, skilled artisans will appreciate that other concentrations may be used.

The scintillating members 307 and 407 can include another scintillating material. The other scintillating material can be an organic scintillating material. In an embodiment, the organic scintillating material can include an aromatic compound. In a particular embodiment, the aromatic compound includes a phenyl or pyrazoline aromatic compound. In another particular embodiment, the organic scintillating material can include 1,4-bis(5-phenyloxazol-2-yl)benzene, 2,5-diphenyloxazole, p-terphenyl, naphthalene, 1,4-bis[2-methylstyryl benzene] ("bis-MSB"), and 1,1,4,4-tetraphenyl-1,3 butadiene ("TPB"), another suitable organic compound, or any combination thereof. The organic scintillating material can be mixed into a solvent, such as toluene, 1-phenyl-1-xylyl ethane (PXE), a linear alkyl benzene (LAB), or another solvent. In an embodiment, the combination of the organic scintillating material and the solvent can be mixed into and dissolve within the polymer matrix.

In another embodiment, the organic scintillating material can be dissolved within an organic liquid that can include an aromatic compound. In a particular embodiment, the aromatic compound can be a homoaromatic compound or a heteroaromatic compound. For example, the organic liquid can include a PXE or an LAB. The inorganic scintillating material can be suspended within the liquid.

I. Materials Matching Embodiments

One set of embodiments can be used to match (1) the light yield of a scintillating compound within the scintillating material and the quantum efficiency of a photodetector for the wavelength of the light emitted at the emission maximum from the scintillating compound to (2) the light yield of another scintillating compound within the other scintillating material and the quantum efficiency of another photodetector for the wavelength of the light emitted at the emission maximum from the other scintillating compound. In a particular embodiment, (1) a product of the light yield of the scintillating compound times the quantum efficiency of the photodetector can be compared to (2) a product of the light yield of the other scintillating compound times the quantum efficiency of the other photodetector. The materials matching embodiments are more readily understood as described with respect to the embodiment as illustrated in FIG. 4. As used herein, the quantum efficiency is a measure of electrons emitted by the photosensor per photon at a particular wavelength received by such photosensor. The quantum efficiency can change with a change in the wavelength of the photon. Quantum efficiency is typically expressed as a percentage.

The scintillating member 407 can include an inorganic scintillating material and an organic scintillating material within a polymer matrix. The photosensors 405 and 455 can be of the same type or different types. If the photosensors 405 and 455 are of different types, the photosensor 405 may be sensitive to scintillating light from the inorganic scintillating material and relatively insensitive to scintillating light from the organic scintillating material. Conversely, the photosensor 455 may be sensitive to scintillating light from the organic scintillating material and relatively insensitive to scintillating light from the inorganic scintillating material. Alternatively, the photosensors 405 and 455 can be of the same type, and the radiation detection system 400 can include different optical filters. One of the optical filters can be used to allow scintillating light from the inorganic scintillating material to pass to photosensor 405 while allowing little or no scintillating light from the organic scintillating material to pass to the photosensor 405. Conversely, another optical filters can be used to allow scintillating light from the organic scintillating material to pass to photosensor 455 while allowing little or no scintillating light from the inorganic scintillating material to pass to the photosensor 455.

In a non-limiting embodiment, the inorganic scintillator includes $LaBr_3(Ce)$ and the organic scintillator can be polystyrene doped with 2,5-diphenyloxazole and 4,4-Bis-(2-butyloctyloxy)-p-quaterphenyl in a polymer matrix that includes PS. The inorganic scintillating material can have a light yield of approximately 20,000 photons/MeV and emit light at approximately 390 nm. The photosensor 405 can have a quantum efficiency of approximately 30% when it receives light at approximately 390 nm. The organic scintillating material can have a light yield of approximately 8,000 photons/MeV and emit light at approximately 490 nm. The photosensor 455 can have a quantum efficiency of approximately 75% when it receives light at approximately 490 nm. In a particular embodiment, both of the photosensors 405 and 455 include the same type of photosensor, and in a more particular embodiment, an avalanche photodiode, such as an s2385™-brand photodiode from Hamamatsu Corporation, can be used. A filter can be located between scintillating member 407 and the photosensor 405, wherein blue light passes; however, no green light or an insignificant amount of green light passes through the filter. Another filter can be located between scintillating member 407 and the photosensor 455, wherein green light passes; however, no blue light or an insignificant amount of blue light passes through the other filter. Examples of such optical filters are 10SWF-450-B™-brand filter and 10LWF-450-B™-brand filter, both available from Newport Corporation. In this manner, blue light from the inorganic scintillating material is received by the photosensor 405, and green light from the organic scintillating material is received by the photosensor 455.

In this embodiment, when expressed as an equation without any approximation:

$$LY_{inorg}*QE_{photo\ 405}=LY_{org}*QE_{photo\ 455}$$

wherein, $LY_{inorg}$ is the light yield of the inorganic scintillating material;

$QE_{photos\ 405}$ is the quantum efficiency of the photosensor 405 when receiving blue light;

$LY_{org}$ is the light yield of the organic scintillating material;

$QE_{photo\ 405}$ is the quantum efficiency of the photosensor 455 when receiving green light.

Using the previously described numbers, 20,000 photons/MeV*30%=8,000 photons/MeV*75%=6,000 photons/MeV.

Such information can be used by the processing module 420 to determine the total amount of energy received of the particular radiation received by the photodetectors 405 and 455 from the scintillating member 407 and can also determine how much of the scintillation is caused by the inorganic scintillating material and how much of the scintillation is caused by the organic scintillating material.

In a further embodiment, the products of the light yield times the quantum efficiency are different from each other. The difference in the products can be used to determine a number based on the differences. In fraction format, the quotient can be:

$$((LY_{inorg}*QE_{photo\ 405})-(LY_{org}*QE_{photo\ 455}))/((LY_x \times QE_x)_{high})$$

wherein, $(LY_x \times QE_x)_{high}$ is the greater of the two products (that is, the greater of $(LY_{inorg}*QE_{photo\ 405})$ or $(LY_{org}*QE_{photo\ 455})$).

In percentage format, $$100\%*((LY_{inorg} \times QE_{photo\ 405})-(LY_{org} \times QE_{photo\ 455}))/((LY_x \times QE_x)_{high})$$

In an embodiment, the quotient or percentage may not exceed the energy resolution of the radiation detecting system used. The energy resolution can be a function of the full width half maximum ("FWHM") for a radiation source as detected by the inorganic scintillating material. For example, $^{137}Ce$ can produce a resonant energy at approximately 0.662 MeV. The radiation detecting system may have a FWHM for $^{137}Ce$ of approximately 0.046 MeV, and therefore, the energy resolution can be the FWHM divided by the resonant energy. When expressed as a percentage, the energy resolution is 0.046 MeV*100%/0.662 MeV, or approximately 7%. In a particular embodiment, the difference in the products of the light yield times the quantum efficiency may be no more than ½ of the energy resolution or approximately 3.5%. Therefore, the difference in the products may be no greater than approximately 3.5%. In another embodiment, the different in the products may be no greater than 2.0%. After reading this specification, skilled artisans will appreciate that the equations and values are used to aid in the understanding of the concepts discussed herein and not to limit the scope of the present invention.

II. Wavelength Discrimination Embodiments

Embodiments for wavelength discrimination can use an equipment set-up as previously described with respect to matched materials embodiments. However, unlike the matched materials embodiments, the products of the light yield times the quantum efficiency do not need to be matched. Thus, there is more latitude and less restriction in selecting photosensors. The light yield for the scintillating materials within the scintillating member 407 and quantum efficiencies of the photosensors 405 and 455 may still need to be known. After particular radiation is received by the scintillating member 407, scintillating light can be emitted by the scintillating member 407. The scintillating light from the inorganic scintillating material is received by the photosensor 405, and the scintillating light from the inorganic scintillating material is received by the photosensor 455. The photosensors 405 and 455 can generate signals, such as electronic pulses, that are transmitted to the processing module 420, via outputs 410 and 460, respectively. At the processing module 420, the signal from the photosensor 405 can be divided by the light yield of the inorganic scintillating material and divided by the quantum efficiency of the photosensor 405 for light at the wavelength of the emission maximum for the inorganic scintillating material. At the processing module 420, the signal from the photosensor 455 can be divided by the light yield of the organic scintillating material and divided by the quantum efficiency of the photosensor 455 for light at the wavelength of the emission maximum for the organic scintillating material. The quotients obtained can reflect the energy received from each of the inorganic and organic scintillator materials.

III. Pulse Shape Discrimination Embodiments

Pulse shape discrimination embodiments are more readily understood with the embodiment as illustrated in FIG. 3. In this embodiment, the quantum efficiency of the photosensor 305 may or may not be used. The pulse shapes for the inorganic and organic scintillating materials within the scintillating member 307 may be significantly different from one another. After particular radiation is received by the scintillating member 307, scintillating light can be emitted by the scintillating member 307. The pulse shape for an inorganic scintillating material may have a significantly longer rise time, decay time, or both rise and decay times than the pulse shape for the organic scintillating material. For example, the pulse decay time for a plastic scintillating material can be significantly shorter than the pulse decay time for an inorganic scintillating material. In a particular non-limiting embodiment, the inorganic scintillator can include NaI(Tl), the organic scintillator can include p-terphenyl plus bis-MSB, and the polymer matrix can include PVT. In a particular embodiment, the organic scintillator can be in the form of BC-408™-brand scintillator available from Saint-Gobain Crystals of Hiram, Ohio, USA. The p-terphenyl plus bis-MSB can have a pulse decay time less than 5 nm, whereas, NaI(Tl) has a pulse decay time of approximately 230 ns. Lutetium yttrium orthosilicate (LYSO) can have a pulse decay of approximately 40 ns. Thus, even when a relatively faster inorganic scintillator is used (LYSO, as compared to NaI(Tl)), its signal can be distinguished from the organic scintillator. Therefore, after reading this specification, skilled artisans will appreciate that a many different inorganic scintillators can be used with an organic scintillator and still allow the discrimination of scintillator light between the inorganic scintillator and organic scintillator.

Figure 5:
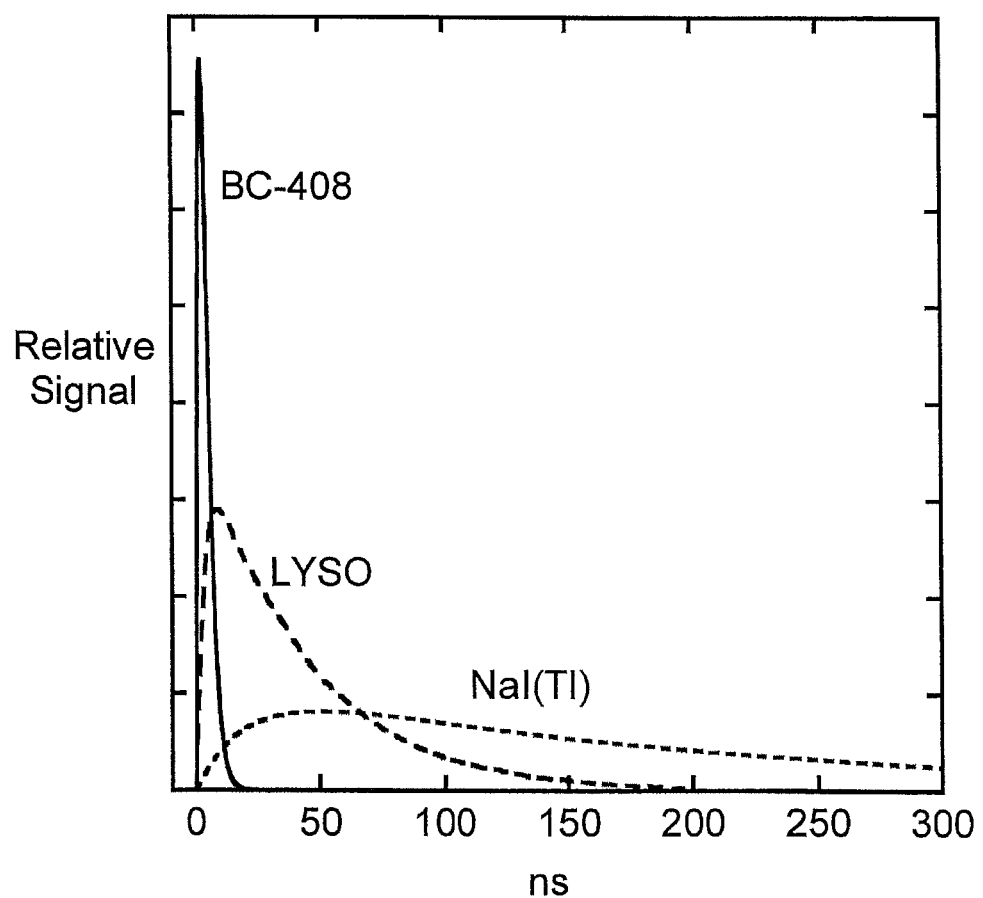
FIG. 5 includes a plot illustrating pulse shapes corresponding to light emitted from different scintillating materials.

FIG. 5 includes an illustration that includes light pulses for the scintillating materials as labeled. Thus, the radiation received by the scintillating member 307 may produce a bi-modal or another multi-modal distribution of pulse shapes. A signal from the photosensor 305 may be a composite of any two or more shapes, depending on the number of scintillator materials present within the scintillating material. In a particular embodiment, a single organic scintillator material and a single inorganic scintillator material may be present within the scintillating member 307. A timing filter can be used to separate the composite signal into individual pulse shapes. Low-pass and high-pass Fourier filters are examples of circuits that can be implemented in a particular embodiment. In another embodiment, another suitable timing filter can be used. The separation of the composite pulse shape into its component pulse shapes can occur within the photosensor 305 or within the processing module 320. The separated signal corresponding to the inorganic scintillating material can be divided by the light yield for that inorganic scintillating material. The separated signal corresponding to the organic scintillating material can be divided by the light yield for that organic scintillating material. The values (separated signals divided by light yields) can be summed to determine the total effective energy of the particular radiation received from the radiation.

IV. Methods of Using the Radiation Detection Systems

Methods of using the radiation detection systems are described below. Many of the activities within the methods can be performed using the different techniques (matched materials, wavelength discrimination, and pulse shape discrimination) to determine the total effective energy of radiation received by scintillating member. To the extent methods between the techniques differ, such differences will be addressed with respect to particular activities. One or more of the radiation detection systems previously described may be used. The methods can be useful in identifying a particular isotope detected, a particular type of radiation detected, locating a source of radiation, or the like.

Figure 6:
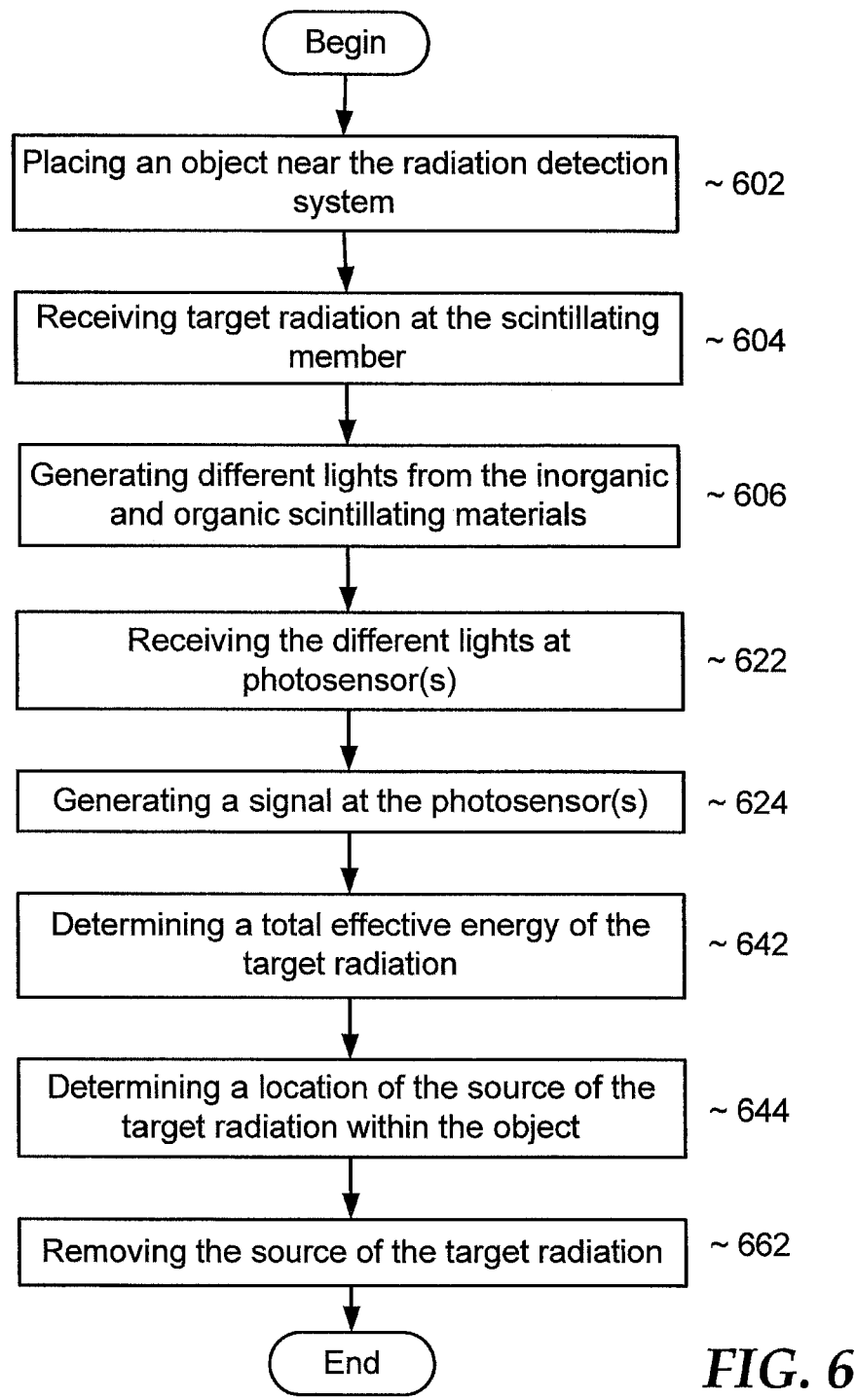
FIG. 6 includes a flow diagram for a method of locating a source of radiation within an object and removing such source from the object.

A method of using a radiation detection system is described in reference to the flow chart in FIG. 6. The method can include placing an object near the radiation detection system, at block 602 of FIG. 6. The object can include a vehicle, such as an automobile, a truck, a watercraft, a rail car, an aircraft, other suitable cargo vehicle, or any portion thereof. In another embodiment, the object can include an article that can be carried by a human. For example, the article can include a purse, a brief case, a case for portable electronics, a suitcase, or a garment bag. Such articles are likely to be used when traveling. In another embodiment, the object can be a living organism, such as a human or other animal or a plant. For example, the human be injected with a radioactive material that will highlight an abnormality within the human, such as a tumor, bone cancer, a blockage within a vein, a parasite, eroded or missing body tissue, or the like. With respect to missing body tissue, a diagnostic image from a patient can be compared to known good image from the same or different patient, and the missing body tissue would correspond to tissue within the known good image that is not seen with the diagnostic image. In still another embodiment, the object can be a portion of the earth. Thus, the term object is to be construed broadly. With respect to placing, the object can be moved while the radiation detection system remains relatively stationary, the radiation detection system can be moved while the object remains relatively stationary, or both the object and radiation detection system can be moved.

The method can also include receiving particular radiation at the scintillating member, at block 604. The particular radiation will be one or more particular types of radiation that are of interest and can include gamma rays, neutrons, other suitable radiation, or any combination thereof. The method can further include generating different light from the inorganic and organic scintillating materials, at block 606. In a particular embodiment, the method can include generating light from an inorganic scintillating material and generating other light from an inorganic scintillating material in response to receiving the particular radiation.

The method can include receiving the different lights (that is, light from the inorganic scintillating material and light from the organic scintillating material) at the photosensor(s), at block 622. For the radiation detection system 300, the different lights are received by the photosensor 305. For the radiation detection system 400, light from the inorganic scintillating material can be received by the photosensor 405, and light from the organic scintillating material can be received by the photosensor 455. One or more optical filters can be used to allow only light of a particular wavelength or particular spectrum of wavelengths to pass to either or both photosensors 405 and 455. The method can also include generating a signal at the photosensor(s), at block 624 of FIG. 6. The signal can be a composite signal, such as the composite signal as described with respect to the pulse shape discrimination technique. In another embodiment, separate signals may be generated, one corresponding to the inorganic scintillating material, and another corresponding to the organic scintillating material. In a particular embodiment, the signal corresponding to the inorganic scintillating material can be sent from the photosensor 405 and received by the processing module 420, via output 410, and the signal corresponding to the organic scintillating material can be sent from the photosensor 455 and received by the processing module 420, via output 460.

The method can include determining a total effective energy of the particular radiation, at block 642. The manner for determining the total effective energy can depend on the technique used. For the materials matching technique, the cumulative effects of the different light yields of the scintillating materials and different quantum efficiencies of the photosensors 405 and 455 are neutralized. In an embodiment, the signals generated at the photosensor 405 can be divided by the product of the light yield of the inorganic scintillating material and the quantum efficiency of the photosensor 405 when receiving blue light, and the signals generated at the photosensor 455 can be divided by the product of the light yield of the organic scintillating material and the quantum efficiency of the photosensor 455 when receiving green light. In a particular embodiment, the quotients can be determined at the processing unit 420. Information regarding the light yields and quantum efficiencies may be persisted within the processing module 420 or stored in the storage device 430, and the processing module 420 can retrieve such information for use in determining the quotients. In another embodiment, the processing module 420 can include hardware or firmware that is configured to perform the previously described operation. Each of the quotients can be summed to determine the total effective energy of the particular radiation received by the scintillating member 407, determine the relative amount of energy deposited within each of the scintillating material, another suitable parameter derived from the quotients, or any combination thereof.

For the wavelength discrimination technique, the signals from the photosensors 405 and 455 can be divided by the light yields of the scintillating materials. In an embodiment, the signals generated at the photosensor 405 can be divided by the light yield of the inorganic scintillating material, and the signals generated at the photosensor 455 can be divided by the light yield of the organic scintillating material. In a particular embodiment, the quotients can be determined at the processing unit 420. Information regarding the light yields may be persisted within the processing module 420 or stored in the storage device 430, and the processing module 420 can retrieve such information for use in determining the quotients. In another embodiment, the processing module 420 can include hardware or firmware that is configured to perform the previously described operation. Each of the quotients can be summed to determine the total effective energy of the particular radiation received by the scintillating member 407, determine the relative amount of energy deposited within each of the scintillating material, another suitable parameter derived from the quotients, or any combination thereof.

For the pulse discrimination technique, signals generated at a photosensor can be processed to determine whether the signals correspond to the inorganic scintillator, the organic scintillator, or a combination thereof. More specifically, the signals generated at the photosensor 305 can be analyzed using pulse shape discrimination using the processing module 320. Code for performing the pulse shape discrimination, pulse shape characteristics, such as rise time, decay time, etc. for the scintillating materials, another suitable information, or any combination thereof may be persisted within the processing module 320 or stored in the storage device 330, and the processing module 320 can retrieve the code, information regarding scintillating material characteristics, or any combination thereof. A processor within the processing module 320 can run the code and use the scintillating material characteristics to separate composite signals into separate signals corresponding to the inorganic scintillating material and the organic scintillating material. In another embodiment, hardware or firmware may perform the pulse shape discrimination without the need for retrieving code or other information from the storage device 330. The hardware or firmware can separate composite signals into separate signals corresponding to the inorganic scintillating material and the organic scintillating material. The separate signals can be divided by their respective light yields may to determine the quotients that reflect the energy deposited within each of the scintillating materials. Each of the quotients can be summed to determine the total effective energy of the particular radiation received by the scintillating member 307, determine the relative amount of energy deposited within each of the scintillating material, another suitable parameter derived from the quotients, or any combination thereof.

Information obtained using the method can be useful in a variety of applications. For example, the information can be used to identify a particular isotope within an object or to identify a particular type of radiation or determine a location where radiation is being emitted from the object.

Figure 7:
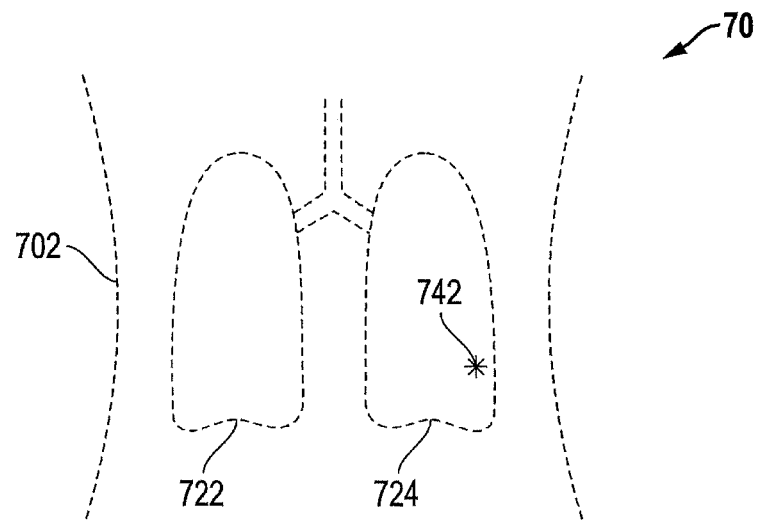
FIG. 7 includes an image of a portion of a human body and a source of radiation within the human.
Figure 8:
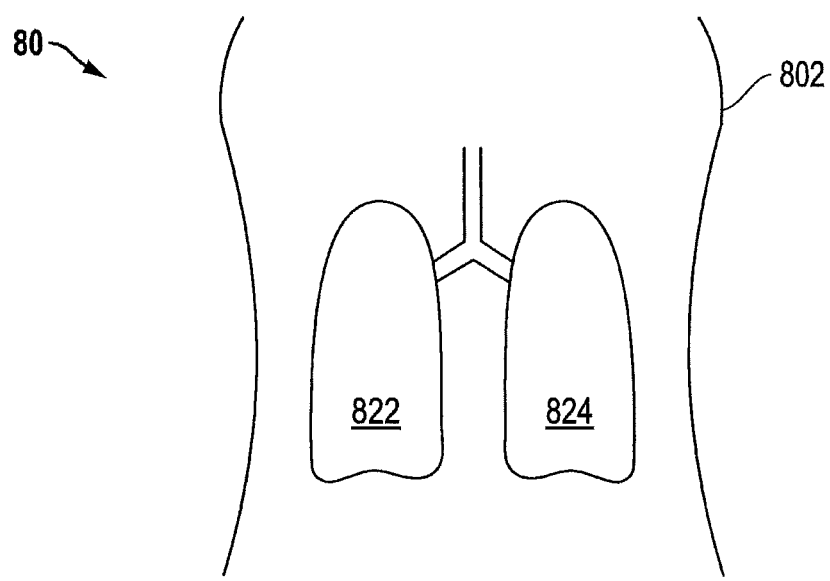
FIG. 8 includes an illustration of the portion of the human body of FIG. 7 after removing the source of radiation.
Figure 9:
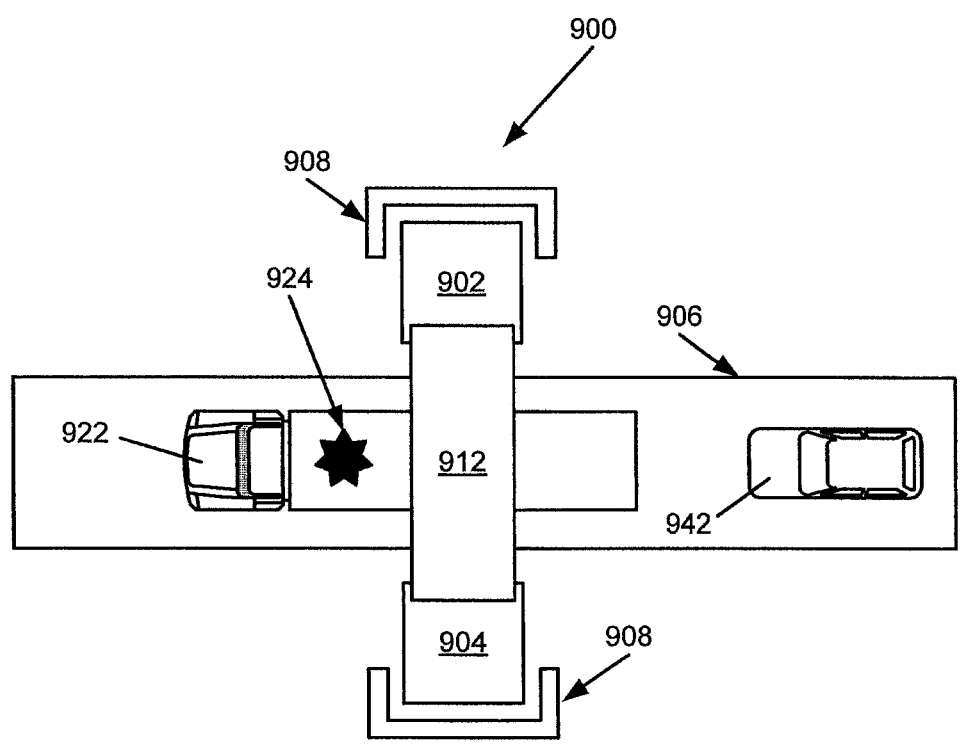
FIG. 9 includes an illustration of a radiation detection system used to detect radiation within vehicles.
Figure 10:
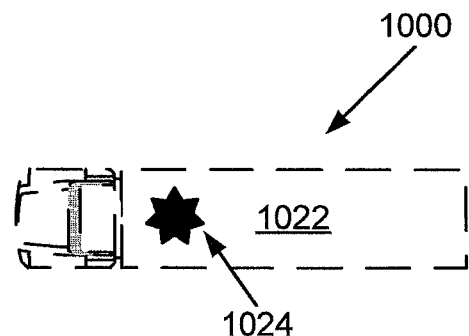
FIG. 10 includes an image of a truck and a source of radiation within the truck.
Figure 11:
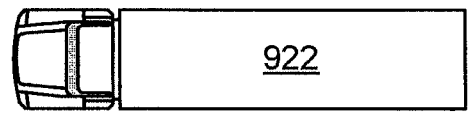
FIG. 11 includes an illustration of the truck of FIG. 10 after removing the source of radiation.

In another example, the total effective energy may be useful in providing an image to a user, such as a human, and can produce a human-readable image regarding the source of radiation. Thus, the method can include determining a location of the source of particular radiation within the object, at block 644 in FIG. 6. For example, a plurality of detectors can be coupled to the scintillating member and used to determine the location based on the relative strengths of signals received by the plurality of detectors. After the source of radiation is located, the method can further include removing the source of the particular radiation, at block 662. FIGS. 7 to 11 illustrate non-limiting practical applications of the systems and methods described herein. FIGS. 7 and 8 are related to detection of an abnormality within a human, and FIGS. 9 to 11 are related to detection of a neutron source within a vehicle.

A human may exhibit physical problems, and a gamma ray analysis, such as a Single Positron Emission Computer Tomography (SPECT) or Positron Emission Tomography (PET) analysis, may be performed using a radiation detection system to determine if there is an abnormality and the location of such abnormality. A radioactive material that emits gamma radiation may be introduced into the human. In a particular embodiment, the human may be injected with or ingest a radioactive material that emits gamma radiation, which is the particular radiation for this particular application. The radioactive material may accumulate more within the abnormality, and thus, the abnormality may include a higher concentration of the radioactive material as compared to other adjacent regions of the human's body. The human can be placed within and analyzed using a radiation detection system as described herein. The radiation detection system may produce an image 70 of a portion of the human, and in particular, an image of the human's torso 702 and lungs 722 and 724. As illustrated in FIG. 7, the image includes an abnormality 742, such as a cancerous tumor, that is located along a wall of the lung 724. A surgeon or other doctor can use the information so that the surgeon can better understand the probable location of the tumor without the need of exploratory surgery. Via an operation or other procedure, the abnormality is removed. In one embodiment, surgery may be used to remove the abnormality, and in another embodiment, a compound may be injected or ingested that preferentially attacks the abnormality. FIG. 8 illustrates that the human 80, and more particularly the torso 802, no longer has an abnormality within the human's lungs 822 and 824. Note that the even though the abnormality may or may not be emitting radiation at the time it is removed, the abnormality can be considered a source of radiation because it was the source during the analysis performed by the radiation detection equipment. The concepts herein are not limited to cancerous tumors within lungs of a human. The abnormality may at located at nearly anywhere within the human, including other organs, tissue, bone, or the like. Further, the abnormality may be a non-cancerous growth, blockage, lack of matter or other erosion or degradation of a body part, or the like. Thus, the concepts as described are flexible for use in analyzing humans. Still further, the techniques can be extended to other living organisms including other animals and plants.

FIGS. 9 to 11 illustrate an embodiment in which radiation within a vehicle can be detected using a radiation detection system. FIG. 9 includes a top view of a radiation detection system 900 that can be provided on a side of a passageway 906, such as a road. The radiation detection system 900 can include radiation detectors 902, 904, and 912. Each of the radiation detectors can include one or more photosensors as previously described and may or may not include other peripheral electronics, such as a processing module, a storage device, networking equipment, or any combination thereof. If any of the radiation detectors 902, 904, 912, or any subcombination thereof does not include a processing module, such radiation detector(s) can be couple to a processing module within a different radiation detector or to a processing unit (not illustrated) at a location spaced apart from the radiation detectors. The radiation detectors 902 and 904 can be oriented vertically (that is, the longest dimension extends in a direction substantially perpendicular to an exposed surface of the passageway 906), and the radiation detector 912 can be oriented horizontally (that is, the longest dimension extends in a direction substantially parallel to the exposed surface of the passageway 906). In an embodiment, the radiation detector 912 can be disposed above the passageway 906, as illustrated in FIG. 9, and in another embodiment, the radiation detector 912 can be disposed below the passageway 906. In another embodiment, more or fewer radiation detectors can be used. Also, the orientation of the radiation detectors can be modified. For example, the radiation detectors 902 and 904 can be staggered along the length of the passageway 906, or any of the radiation detectors 902, 904, and 912 can be oriented in a direction other than substantially parallel or perpendicular to the passageway 906 (for example, at an acute angle with respect to a plane defined by the exposed surface of the passageway 906. After reading this specification, skilled artisans will appreciate that other combinations of radiation detectors and orientations of such radiation detectors can be used within the scope of the concepts described herein. If needed or desired, a collimator 908 can be placed near a radiation detector, such as the radiation detectors 902 and 904. The collimator 908 can include a shape and material suitable to substantially prevent neutrons, gamma radiation, or any combination thereof, from being received from an object that is over the passageway 906.

Two vehicles are on the passageway 906 as illustrated in FIG. 9. In the illustrated embodiment, a truck 922 includes a radiation source 924 that emits particular radiation. In a particular embodiment, the particular radiation is neutrons, and therefore, the radiation source 924 emits neutrons. In a particular embodiment, the radiation source 924 is not readily visible upon inspection of the truck 922 by a human. Unlike the truck 922, an automobile 942 does not include a radiation source that emits a significant amount of neutrons. The vehicles pass over the passageway 906 near the radiation detection system 900. The radiation detecting system 900 can generate an image 1000 as illustrated in FIG. 10. The image 1000 includes an image of the truck 1022 including an image of the radiation source 1024. In an embodiment where a plurality of radiation detectors are used, the location of the radiation source 924 can be more precisely located. When the trailer of the truck 922 includes many boxes, the ability to locate precisely the location of the radiation source 924 may allow an inspector or other human to locate and remove the radiation source 924 more quickly and reduce the number of boxes that need to be opened or further analyzed. FIG. 11 includes an illustration of the truck 922 after the radiation source 924 has been removed. The automobile 942 does not have a radiation source, and therefore, may pass the inspection.

In another embodiment, a different type of vehicle can be used with the radiation detection system. For example, the vehicle can include a watercraft, a rail car, an aircraft, or another suitable cargo vehicle. Thus, the radiation detection system can be used at a dock, a railroad, or an airport. Further, the radiation detection system can be used for detecting radiation within containers that may be loaded onto or unloaded from the vehicle. Still further, the radiation detection system can be used at a security checkpoint for detecting radiation within a human or carried by a human.

The radiation detection system is not limited to systems that only detect gamma rays or neutrons. In another embodiment, a radiation detection system may be configured to detect x-rays, alpha particles, beta particles, or potentially other radiation.

The radiation detection system is not limited to having only a combination of an inorganic scintillating material and an organic scintillating material. In another embodiment, the radiation detection system can include a combination of inorganic scintillators or a combination of organic scintillators, wherein the combination includes different scintillating materials that scintillate in the presence of the same type of particular radiation (for example, gamma rays, neutrons, x-rays, alpha particles, beta particles, or the like).

In an embodiment, the radiation detection system can provide benefits over conventional radiation detection systems. In a particular embodiment, the radiation detection system can include nano-sized particles of a scintillating material, which may allow the scintillating member to become larger and remain substantially transparent without problems seen with large single crystals or particles having a size greater than one micron. In another embodiment, the presence of more than one scintillating material allows a particular material having relatively higher light yield to be used with another scintillating material having relatively lower light yield. The organic scintillating material can overcome potential problems that may occur if the organic scintillating material was not used and the concentration of the inorganic scintillating material was merely increased. For example, the organic scintillating material can allow a scintillating composite to be processed without having to redesign equipment or substantially alter processing conditions generally used when processing a particular polymer material when forming the scintillating composite in making the scintillating member.

Because the scintillating member can include a polymer matrix, the radiation detection system may be relatively rugged and able to be used in outdoor environments. Further, the polymer matrix may sufficiently protect a scintillating material that is relatively sensitive to water, hydrogen, or other environmental contaminants. Thus, a hygroscopic scintillating material may not need to be within a hermetically sealed container. Still further, the scintillating member may be significantly more inexpensive to form. Thus, the radiation detection system can be in the form of or include a disposable camera, for example, a disposable gamma ray camera.

In another embodiment, a variety of techniques can be employed so that the total effective radiation received by a scintillating member can be determined. In particular, the scintillating member can include nano-sized scintillating particles; however scintillating light may be generated outside the nano-sized scintillating particles. In embodiments described herein, different techniques can be used to account for different light yields of different scintillating materials. For example, the techniques can adjust for the light yield differences between the scintillating materials to provide accurate energy information regarding particular radiation received by the scintillating member. Such energy information can be useful in identifying isotopes, identifying types of radiation, or providing images to locate more precisely the location of a radiation source of particular radiation.

In summary, a particular embodiment of a radiation detection system can have good characteristics and allow for good overall scintillating light yield to be obtained in a relatively large scintillating member while maintaining transparency of the scintillating member to scintillating light. Further, the particular embodiment can maintain acceptable processing conditions when forming the scintillating member as scintillating materials within a polymer matrix. Still further, the particular embodiment can be used in a relatively more rugged environment and can be less sensitive to environmental conditions. Also, the particular embodiment can be potentially less expensive, and obtain accurate energy information regarding a radiation source being analyzed by the radiation detection system. After reading this specification, skilled artisans will appreciate that not all of the described features are required, and any subset of those features may be exploited for a particular application.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation detection system can include a first scintillating material to produce a first light in response to the radiation detection system receiving a particular radiation, wherein the first scintillating material has a first light yield. The radiation detection system can also include a first photosensor coupled to the first scintillating material, wherein the first photosensor has a first quantum efficiency with respect to the first light. The radiation detection system can further include a second scintillating material to produce a second light in response to the radiation detection system receiving the particular radiation, wherein the second scintillating material has a second light yield. The radiation detection system can still further include a second photosensor coupled to the second scintillating material, wherein the second photosensor has a second quantum efficiency with respect to the second light. The first scintillating material can be different from the second scintillating material. For the radiation detection system, a first product can be the first light yield times the first quantum efficiency, and a second product can be the second light yield times the second quantum efficiency, and a product difference can be an absolute value of a difference the first product minus the second product. A quotient can be the product difference divided by a greater of the first and second products, wherein the quotient is no greater than one half of the energy resolution of the first scintillating material.

In an embodiment of the first aspect, at emission maxima, a wavelength of the first light is different from a wavelength of the second light. In another embodiment, the first scintillating material includes an inorganic scintillating material. In still another embodiment, the first scintillating material includes particles embedded within a polymer matrix. In a particular embodiment, the first scintillating material includes a sodium iodide, a calcium fluoride, a cesium iodide, a cesium lithium elpasolite, a lanthanum bromide, a lanthanum chloride, a lutetium iodide, a bismuth germanate, or a lutetium silicate. In a further particular embodiment, the first scintillating material has an effective atomic number of at least approximately 20, at least approximately 30, or at least approximately 40.

In another particular embodiment of the first aspect, the particles have an averaged size of no greater than one half of a wavelength at an emission maximum of the first light. In still another embodiment, the particles have an averaged size in a range of 5 nm to 20 nm In a yet another particular embodiment, the particles are characterized by a $5^{th}$ percentile size and a $95^{th}$ percentile size, wherein the $95^{th}$ percentile size is no greater than 4 times the $5^{th}$ percentile size. In a further particular embodiment, the polymer matrix includes polystyrene, polyvinyltoluene, poly(methyl methacrylate), or any combination thereof. In still a further particular embodiment, the second scintillating material includes a fluorescent dye. In yet a further particular embodiment, the second scintillating material include 1,4-bis(5-phenyloxazol-2-yl)benzene, 2,5-diphenyloxazole, p-terphenyl, naphthalene, 1,4-bis[2-methylstyryl benzene], or (1,1,4,4-tetraphenyl-1,3 butadiene. In another particular embodiment of the first aspect, the first scintillating material, the second scintillating material, and the polymer matrix are parts of a scintillating composite. In still another particular embodiment, the second scintillating material is dissolved in the polymer matrix.

In a further embodiment of the first aspect, the first scintillating material is an inorganic material, and the second scintillating material is an organic material. In another further embodiment, the first scintillating material includes particles within an organic liquid. In another embodiment, the first photosensor and the second photosensor are a same photosensor. In still a further embodiment, the first photosensor and the second photosensor are different photosensors. In yet a further embodiment, the first and second scintillating materials lie within a scintillating member, wherein the scintillating member has a length of at least approximately 0.5 meters. In another embodiment, the first and second scintillating materials lie within a scintillating member, wherein the scintillating member has a length of at least approximately 0.7 meters. In still another embodiment, the first and second scintillating materials lie within a scintillating member, wherein the scintillating member has a length of at least approximately 1.1 meters.

In a second aspect, a radiation detection system can include a first scintillating material to produce a first light in response to the radiation detection system receiving a particular radiation, wherein the first light has a first emission maximum at a first wavelength, and wherein the first scintillating material has a first light yield. The radiation detection system can also include a first photosensor coupled to the first scintillating material, wherein the first photosensor is configured to generate a first signal in response to receiving the first light. The radiation detection system can further include a second scintillating material to produce a second light in response to the radiation detection system receiving the particular radiation, wherein the second light has a second emission maximum at a second wavelength that is different from the first wavelength, and wherein the second scintillating material has a second light yield. The radiation detection system can still further include a second photosensor coupled to the second scintillating material, wherein the second photosensor is configured to generate a second signal in response to receiving the second light. The radiation detection system can yet further include a processing module configured to perform operations of: dividing the first signal by the first light yield to obtain a first corresponding energy after receiving the first signal from the first photosensor, dividing the second signal by the second light yield to obtain a second corresponding energy after receiving the second signal from the second photosensor, and summing the first and second corresponding energies to obtain a total effective energy.

In an embodiment of the second aspect, the radiation detection system further includes a first filter disposed between the first scintillating material and the first photosensor. In a particular embodiment, the radiation detection system further includes a second filter disposed between the second scintillating material and the second photosensor. In another embodiment, the operations are implemented as hardware or firmware within the processing module. In still another embodiment, the processing module is configured to read code stored within a tangible processor-readable medium, wherein the code includes instructions to carry out the operations. In yet another embodiment, the radiation detection system is configured to receive radiation from an object near the radiation detection system and generate a human-readable image that includes a location of a source of the particular radiation. In a particular embodiment, the location of the source of the particular radiation is based at least in part on the total effective energy.

In a further embodiment of the second aspect, the first scintillating material includes inorganic particles embedded within a polymer matrix. In a particular embodiment, the first scintillating material includes a sodium iodide, a calcium fluoride, a cesium iodide, a cesium lithium elpasolite, a lanthanum bromide, a lanthanum chloride, a lutetium iodide, a bismuth germanate, or a lutetium silicate. In a further particular embodiment, the first scintillating material has an effective atomic number of at least approximately 20, at least approximately 30, or at least approximately 40.

In another particular embodiment, the particles have an averaged size of no greater than one half of the first wavelength. In still another particular embodiment, the inorganic particles have an averaged size in a range of 5 nm to 20 nm. In yet another particular embodiment, the particles are characterized by a $5^{th}$ percentile size and a $95^{th}$ percentile size, wherein the $95^{th}$ percentile size is no greater than 4 times the $5^{th}$ percentile size. In a further particular embodiment, the polymer matrix includes polystyrene, polyvinyltoluene, poly(methyl methacrylate), or any combination thereof. In another further particular embodiment, the second scintillating material includes a fluorescent dye. In yet a further particular embodiment, the second scintillating material include 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene. In another particular embodiment, the second scintillating material is dissolved in the polymer matrix. In still another particular embodiment, the first scintillating material, the second scintillating material, and the polymer matrix are parts of a scintillating composite.

In a further embodiment of the second aspect, the first scintillating material is an inorganic material, and the second scintillating material is an organic material. In another embodiment, the first scintillating material includes particles within an organic liquid. In still another embodiment, the first and second scintillating materials lie within a scintillating member, wherein the scintillating member has a length of at least approximately 0.5 meters. In still a further embodiment, the first and second scintillating materials lie within a scintillating member, wherein the scintillating member has a length of at least approximately 0.7 meters. In yet a further embodiment, the first and second scintillating materials lie within a scintillating member, wherein the scintillating member has a length of at least approximately 1.1 meters. In another embodiment, the operations further include identifying a particular isotope detected. In still another embodiment, the operations further include identifying a particular type of radiation.

In a third aspect, a radiation detection system can include a first scintillating material to produce a first light in response to the radiation detection system receiving a particular radiation, wherein the first scintillating material has a first light yield. The radiation detection system can also include a second scintillating material to produce a second light in response to the radiation detection system receiving the particular radiation, wherein the second scintillating material has a second light yield. The radiation detection system can further include a photosensor coupled to the first and second scintillating materials, wherein the photosensor is configured to generate a signal in response to receiving the first and second lights. The radiation detection system can still further include a processing module configured to perform operations of: after receiving the signal from the first photosensor, separating the signal into a first component that corresponds to the first light and a second component that corresponds to the second light, dividing the first component by the first light yield to obtain a first corresponding energy; dividing the second component by the second light yield to obtain a second corresponding energy; and summing the first and second corresponding energies to obtain a total effective energy.

In an embodiment of the third aspect, a decay time of the first scintillating material is longer than a decay time of the second scintillating material. In a particular embodiment, the operation to separate the signal includes an operation to perform pulse shape discrimination using the signal. In another embodiment, the operations are implemented as hardware or firmware within the processing module. In still another embodiment, the processing module is configured to read code stored within a tangible processor-readable medium, wherein the code includes instructions to carry out the operations. In a further embodiment of the third aspect, the radiation detection system is configured to receive radiation from an object near the radiation detection system and generate a human-readable image that includes a location of a source of the particular radiation. In a particular embodiment, the location of the source of the particular radiation is based at least in part on the total effective energy.

In another embodiment of the third aspect, the first scintillating material includes inorganic particles embedded within a polymer matrix. In a particular embodiment, the first scintillating material includes a sodium iodide, a calcium fluoride, a cesium iodide, a cesium lithium elpasolite, a lanthanum bromide, a lanthanum chloride, a lutetium iodide, a bismuth germanate, or a lutetium silicate. In a further particular embodiment, the first scintillating material has an effective atomic number of at least approximately 20, at least approximately 30, or at least approximately 40.

In another particular embodiment, the particles have an averaged size of no greater than one half of a wavelength at an emission maximum of the first light. In still another particular embodiment, the inorganic particles have an averaged size in a range of 5 nm to 20 nm. In yet another particular embodiment, the particles are characterized by a $5^{th}$ percentile size and a $95^{th}$ percentile size, wherein the $95^{th}$ percentile size is no greater than 4 times the $5^{th}$ percentile size. In a further particular embodiment, the polymer matrix includes polystyrene, polyvinyltoluene, poly(methyl methacrylate), or any combination thereof. In still a further particular embodiment, the second scintillating material includes a fluorescent dye. In yet a further particular embodiment, the second scintillating material include 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene. In another particular embodiment, the second scintillating material is dissolved in the polymer matrix. In still another particular embodiment, the first scintillating material, the second scintillating material, and the polymer matrix are parts of a scintillating composite.

In still a further embodiment of the third aspect, the first scintillating material is an inorganic material, and the second scintillating material is an organic material. In another embodiment, the first scintillating material includes particles within an organic liquid. In still another embodiment, the first and second scintillating materials lie within a scintillating member, wherein the scintillating member has a length of at least approximately 0.5 meters. In yet another embodiment, the first and second scintillating materials lie within a scintillating member, wherein the scintillating member has a length of at least approximately 0.7 meters. In a further embodiment, the first and second scintillating materials lie within a scintillating member, wherein the scintillating member has a length of at least approximately 1.1 meters. In still a further embodiment, the operations further include identifying a particular isotope detected. In yet a further embodiment, the operations further include identifying a particular type of radiation.

In a fourth aspect, a method of using a radiation detection system can include providing the radiation detection system including a scintillating member including a first scintillating material and a second scintillating material different from the first scintillating material, and at least one photosensor coupled to the scintillating member. The method can also include placing an object near the radiation detection system, wherein the object includes a source that emits a particular radiation, receiving particular radiation at the scintillating member, and generating a first light from the first scintillating material and a second light from the second scintillating material in response to receiving the particular radiation. The method can further include receiving the first and second lights at the at least one photosensor, generating a signal at the at least one photosensor, and determining a total effective energy of the particular radiation based at least in part on the signal.

In an embodiment of the fourth aspect, the first scintillating member further includes a polymer matrix, wherein the first scintillating material and the second scintillating material are within the polymer matrix. In another embodiment, the second scintillating material is dissolved in the polymer matrix. In still another embodiment, the first scintillating material includes particles within an organic liquid.

In a further embodiment of the fourth aspect, the method further includes determining an isotope present within the object. In another embodiment, the method further includes determining a particular type of radiation emitted by the object. In still another embodiment, the method further includes determining a location of the source of the particular radiation within the object. In a particular embodiment, the method further includes removing the source of the particular radiation from the object. In a more particular embodiment, the object is a living organism, and more particularly a human. In an even more particular embodiment, the source of the particular radiation is an abnormality within the human, and more particularly, a tumor. In another particular embodiment, the object is part of a vehicle. In still another particular embodiment, the object is capable of being carried by a human. In a more particular embodiment, the object is a purse, a brief case, a case for portable electronics, a suitcase, or a garment bag.

In a further embodiment of the fourth aspect, the first scintillating material includes a sodium iodide, a calcium fluoride, a cesium iodide, a cesium lithium elpasolite, a lanthanum bromide, a lanthanum chloride, a lutetium iodide, a bismuth germanate, or a lutetium silicate. In another embodiment, the first scintillating material has an effective atomic number of at least approximately 20, at least approximately 30, or at least approximately 40. In still a further embodiment, the particles have an averaged size of no greater than one half of a wavelength at the emission maximum of the first light. In yet a further embodiment, the inorganic particles have an averaged size in a range of 5 nm to 20 nm. In another embodiment, the particles are characterized by a $5^{th}$ percentile size and a $95^{th}$ percentile size, wherein the $95^{th}$ percentile size is no greater than 4 times the $5^{th}$ percentile size.

In still another embodiment of the fourth aspect, the polymer matrix includes polystyrene, polyvinyltoluene, poly(methyl methacrylate), or any combination thereof. In yet another embodiment, the second scintillating material includes a fluorescent dye. In a further embodiment, the second scintillating material include 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene. In another particular embodiment, the second scintillating material is dissolved in the polymer matrix. In still another particular embodiment, the first scintillating material, the second scintillating material, and the polymer matrix are parts of a scintillating composite.

In still a further embodiment of the third aspect, the first scintillating material is an inorganic material, and the second scintillating material is an organic material. In another embodiment, the first scintillating material includes particles within an organic liquid. In still another embodiment, the first and second scintillating materials lie within a scintillating member, wherein the scintillating member has a length of at least approximately 0.5 meters. In yet a further embodiment, the first and second scintillating materials lie within a scintillating member, wherein the scintillating member has a length of at least approximately 0.7 meters. In yet another embodiment, the first and second scintillating materials lie within a scintillating member, wherein the scintillating member has a length of at least approximately 1.1 meters.

Note that not all of the activities described above in the general description or the examples are required, that a portion of a specific activity may not be required, and that one or more further activities may be performed in addition to those described. Still further, the order in which activities are listed is not necessarily the order in which they are performed.

In a particular embodiment, a method may be described in a series of sequential actions. The sequence of the actions and the party performing the actions may be changed without necessarily departing from the scope of the teachings unless explicitly stated to the contrary. Actions may be added, deleted, or altered. Also, a particular action may be iterated. Further, actions within a method that are disclosed as being performed in parallel may in particular cases be performed serially, and other actions within a method that are disclosed as being performed serially may in particular cases be performed in parallel.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
a first scintillating material to produce a first light in response to the radiation detection system receiving a particular radiation, wherein the first scintillating material has a first light yield;
a first photosensor coupled to the first scintillating material, wherein the first photosensor has a first quantum efficiency with respect to the first light;
a second scintillating material to produce a second light in response to the radiation detection system receiving the particular radiation, wherein the second scintillating material has a second light yield; and
a second photosensor coupled to the second scintillating material, wherein the second photosensor has a second quantum efficiency with respect to the second light,
wherein:
the first scintillating material is different from the second scintillating material;
a first product is the first light yield times the first quantum efficiency;
a second product is the second light yield times the second quantum efficiency;
a product difference is an absolute value of a difference the first product minus the second product;
a quotient is the product difference divided by a greater of the first and second products; and
the quotient is no greater than one half of the energy resolution of the first scintillating material.

2. The radiation detection system of claim 1, wherein the first scintillating material includes particles embedded within a polymer matrix.

3. The radiation detection system of claim 2, wherein the particles have an averaged size in a range of 5 nm to 20 nm.

4. The radiation detection system of claim 2, wherein the particles are characterized by a $5^{th}$ percentile size and a $95^{th}$ percentile size, wherein the $95^{th}$ percentile size is no greater than 4 times the $5^{th}$ percentile size.

5. The radiation detection system of claim 2, wherein the second scintillating material includes 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene.

6. A radiation detection system comprising:
a first scintillating material to produce a first light in response to the radiation detection system receiving a particular radiation, wherein the first light has a first emission maximum at a first wavelength, and wherein the first scintillating material has a first light yield;
a first photosensor coupled to the first scintillating material, wherein the first photosensor is configured to generate a first signal in response to receiving the first light;
a second scintillating material to produce a second light in response to the radiation detection system receiving the particular radiation, wherein the second light has a second emission maximum at a second wavelength that is different from the first wavelength, and wherein the second scintillating material has a second light yield;
a second photosensor coupled to the second scintillating material, wherein the second photosensor is configured to generate a second signal in response to receiving the second light; and
a processing module configured to perform operations of:
dividing the first signal by the first light yield to obtain a first corresponding energy after receiving the first signal from the first photosensor;
dividing the second signal by the second light yield to obtain a second corresponding energy after receiving the second signal from the second photosensor; and
summing the first and second corresponding energies to obtain a total effective energy.

7. The radiation detection system of claim 6, further comprising a first filter disposed between the first scintillating material and the first photosensor.

8. The radiation detection system of claim 6, wherein the radiation detection system is configured to receive radiation from an object near the radiation detection system and generate a human-readable image that includes a location of a source of the particular radiation.

9. The radiation detection system of claim 6, wherein the first scintillating material includes inorganic particles embedded within a polymer matrix.

10. The radiation detection system of claim 9, wherein the inorganic particles have an averaged size in a range of 5 nm to 20 nm.

11. The radiation detection system of claim 9, wherein the second scintillating material includes 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene.

12. A radiation detection system comprising:
   a first scintillating material to produce a first light in response to the radiation detection system receiving a particular radiation, wherein the first scintillating material has a first light yield;
   a second scintillating material to produce a second light in response to the radiation detection system receiving the particular radiation, wherein the second scintillating material has a second light yield;
   a photosensor coupled to the first and second scintillating materials, wherein the photosensor is configured to generate a signal in response to receiving the first and second lights; and
   a processing module configured to perform operations of:
      after receiving the signal from the photosensor, separating the signal into a first component that corresponds to the first light and a second component that corresponds to the second light;
      dividing the first component by the first light yield to obtain a first corresponding energy;
      dividing the second component by the second light yield to obtain a second corresponding energy; and
      summing the first and second corresponding energies to obtain a total effective energy.

13. The radiation detection system of claim 12, wherein a decay time of the first scintillating material is longer than a decay time of the second scintillating material.

14. The radiation detection system of claim 12, wherein the radiation detection system is configured to receive radiation from an object near the radiation detection system and generate a human-readable image that includes a location of a source of the particular radiation.

15. The radiation detection system of claim 12, wherein the first scintillating material includes inorganic particles embedded within a polymer matrix.

16. The radiation detection system of claim 15, wherein the inorganic particles have an averaged size in a range of 5 nm to 20 nm.

17. The radiation detection system of claim 15, wherein the second scintillating material includes 1,4-bis(5-phenyloxazol-2-yl)benzene, 2,5-diphenyloxazole, p-terphenyl, naphthalene, 1,4-bis[2-methylstyryl benzene], or 1,1,4,4-tetraphenyl-1,3 butadiene.

* * * * *